(12) United States Patent
Benz (10) Patent No.: US 11,401,143 B2
(45) Date of Patent: Aug. 2, 2022

(54) PIVOT LOCKING DEVICE AND LIFTING DEVICE HAVING A PIVOT LOCKING DEVICE

(71) Applicant: Gerhard Finkbeiner, Freudenstadt (DE)

(72) Inventor: Dieter Benz, Alpirsbach (DE)

(73) Assignee: Gerhard Finkbeiner, Freudenstadt (DE)

( * ) Notice: Subject to any disclaimer, the term of this patent is extended or adjusted under 35 U.S.C. 154(b) by 512 days.

(21) Appl. No.: 16/603,654

(22) PCT Filed: Apr. 10, 2018

(86) PCT No.: PCT/EP2018/059086
§ 371 (c)(1),
(2) Date: Oct. 8, 2019

(87) PCT Pub. No.: WO2018/189137
PCT Pub. Date: Oct. 18, 2018

(65) Prior Publication Data
US 2020/0115206 A1 Apr. 16, 2020

(30) Foreign Application Priority Data
Apr. 13, 2017 (DE) .......................... 102017108064.3

(51) Int. Cl.
*B66F 7/00* (2006.01)
*B66F 7/28* (2006.01)
(Continued)

(52) U.S. Cl.
CPC .................. *B66F 7/28* (2013.01); *B66F 3/46* (2013.01); *B66F 2700/12* (2013.01);
(Continued)

(58) Field of Classification Search
CPC .......... B66F 7/00; B66F 7/065; B66F 7/0658; B66F 7/0683; B66F 3/46; F16C 19/00; F16C 19/30; F16C 19/50; F16C 2300/14
See application file for complete search history.

(56) References Cited

U.S. PATENT DOCUMENTS 4,913,563 A    4/1990  Veronesi et al.
6,866,124 B1 *  3/2005  Barkis ..................... B66F 7/025
                                                  414/233

(Continued)

FOREIGN PATENT DOCUMENTS

CN          2491414 Y     5/2002
CN        205015077 U     2/2016
(Continued)

OTHER PUBLICATIONS

International Search Report and Written Opinion for corresponding Patent Application No. PCT/EP2018/059086 dated Jul. 23, 2018.

*Primary Examiner* — Lee D Wilson
(74) *Attorney, Agent, or Firm* — Renner, Otto, Boisselle & Sklar, LLP (57) ABSTRACT

The invention relates to a pivot locking device of two bearing elements (102, 103) oriented towards a common axis, in which one or both bearing elements (102, 103) are pivotable about a common pivot axis (22), with a first bearing element (102), which comprises a perforation (104), with a second bearing element (103), which comprises a perforation (106), wherein the first and second bearing elements (102, 103) are oriented in alignment to one another with the perforations (104, 106), with a chamber (124) provided on the first bearing element (102), which chamber comprises a circulatory path for circulatory elements (129) and is open to the second bearing element (103) and, by a connecting surface (118) facing to the chamber (124), is closed on the second bearing element (103), with a plurality (Continued)

of circulatory elements (129) arranged in the chamber (124), with an catch (121) arrangeable on the second bearing element (103), which catch engages into the circulating chamber (124) and is positioned between circulatory elements (129) and, in a pivot movement of the second bearing element (103) to the first bearing element (102), displaces the circulatory elements (129) in the chamber (124) along the circulatory path, and with a locking element (107) arranged on the first bearing element (102), which locking element, in an unlocking position (109), unblocks the circulatory path for the circulatory elements (129) in the chamber (124) and, in a locking position (108) of the locking element (107), blocks a displacement movement of the circulatory elements (129) along the circulatory path of the chamber (124).

20 Claims, 10 Drawing Sheets

(51) Int. Cl.
*B66F 3/46* (2006.01)
*F16C 19/30* (2006.01)
*F16C 19/50* (2006.01)

(52) U.S. Cl.
CPC .............. *F16C 19/30* (2013.01); *F16C 19/50* (2013.01); *F16C 2300/14* (2013.01)

(56) References Cited

U.S. PATENT DOCUMENTS

| | | | |
|---|---|---|---|
| 10,737,921 B2* | 8/2020 | Motley | B66C 19/00 |
| 10,787,349 B2* | 9/2020 | Benz | B66F 7/02 |
| 2005/0235460 A1 | 10/2005 | Stewart | |
| 2013/0233651 A1 | 9/2013 | Kritzer | |
| 2016/0122168 A1* | 5/2016 | Benz | B66F 3/46 |
| | | | 254/133 R |
| 2020/0115206 A1* | 4/2020 | Benz | B66F 7/28 |
| 2020/0148517 A1* | 5/2020 | Nussbaum | G01G 19/021 |
| 2020/0408261 A1* | 12/2020 | Nakanishi | F16C 19/06 |
| 2021/0387838 A1* | 12/2021 | Green | B66F 7/28 |

FOREIGN PATENT DOCUMENTS

| | | |
|---|---|---|
| CN | 105307969 B | 2/2018 |
| CN | 105517945 B | 8/2018 |
| DE | 30 26 160 A1 | 2/1982 |
| DE | 93 03 688 U1 | 8/1994 |
| DE | 10 2007 020 041 A1 | 10/2008 |
| EP | 0 478 035 B1 | 4/1992 |

* cited by examiner

PIVOT LOCKING DEVICE AND LIFTING DEVICE HAVING A PIVOT LOCKING DEVICE

The invention relates to a pivot locking device, as well as a lifting device with an up- and downwardly movable carrier and at least one support arm, pivotably mounted on the carrier, with a pivot locking device for the support arm.

EP 0 478 035 B1 discloses an arresting device for a support arm of a motor vehicle lifting platform. This vehicle lifting device includes at least one column, along which a carrier is up- and downwardly movable. Two pivotably mounted support arms are provided on the carrier. An arresting device is provided for adjusting an angular position of the support arms to one another, or of the support arm to the carrier. This arresting device consists of two cooperating toothed elements which are provided coaxially to the pivot axis. By a displacement movement along the pivot axis by a toothed element, this toothed element comes out of engagement from the other toothed element and unblocks a pivot movement of the support arm. Such an unblocking of the pivot movement is actuated in the lowering of the carrier onto the base. In the lifting of the carrier, the toothed elements oriented coaxially to the pivot axis are again moved towards one other, so that the toothed elements engage into one another. Here, high mechanical loads between the toothed elements can occur, insofar as these elements are not oriented with a gap to one another. Often, a manual supporting for the exact positioning of the support arm to the carrier for the aligned orientation of the toothed elements is required. Such toothed elements are subject to a high wear mechanism due to the mechanical processing and are cost-intensive in production.

DE 10 2007 020 041 A1 further discloses a mechanically configured support arm arrest for a lifting device. A first and a second locking element are oriented coaxially to a pivot axis in this support arm arrest as well, wherein an axial displacement movement by one of the two locking elements oriented to one another is initiated via the load bearing element in a lowering movement of a carrier onto the base. A pivoting movement of the support arm is thereby unblocked. In the lifting of the carrier, the two locking elements are again moved towards one another along the pivot axis, in order to lock.

The object underlying the invention is to provide a mechanical pivot locking device, in particular a lifting device, for arresting support arms with a pivot locking device which is configured mechanically simply and cost-effectively.

This object is achieved by a pivot locking device, which comprises two bearing elements aligned along a common pivot axis, wherein one or both bearing elements are pivotable to the common pivot axis, wherein a first bearing element comprises a first perforation, and the second bearing element comprises a second perforation, which are oriented in alignment to one another, and a chamber with a circulatory path is provided on the first bearing element, which is open to the second bearing element and is closed on the second bearing element by a connecting surface facing to the chamber, wherein a plurality of circulatory elements is arranged in the chamber and with a catch arranged on the second bearing element, which engages into the chamber and is positioned between circulatory elements and, in a pivot movement of the second bearing element, displaces the circulatory elements within the chamber, and with a locking element arranged on the first bearing element, which locking element unblocks the circulatory path of the chamber in an unlocking position and, in a locking position, blocks a displacement movement of the circulatory elements along the chamber.

Such a pivot locking assembly has the advantage that, for a release or a blocking of a pivot movement of the first bearing element to the second bearing element, the activation of the locking element is required, without a relative movement of the first bearing element to the second bearing element along the pivot axis being required. A flat pivot locking device can thereby be created, in which the construction volume is equal in a releasing, as well as in a blocking of the pivot movement. In addition, a wear-free configuration is made possible by means of this pivot locking device. Moreover, a finely graduated locking is preferably made possible due to the circulatory elements, so that a nearly continuous arresting of the first bearing element in an angular position to the second bearing element is made possible.

Preferably, the chamber is configured in the shape of a circle or a circular arc. A simple guiding of the circulatory elements inside the chamber can thereby be provided, which preferably includes a circulatory path.

Moreover, the chamber preferably comprises a blocking region with a width in front of and behind the locking element blocking the circulatory path of the chamber, so that the circulatory elements are guided through the blocking region in a single-tracked manner, that means that the circulatory elements are guided displaceably in a row one behind the other through the region in front of and behind the locking element. This makes the configuration of a simple locking mechanism possible, for example in such a way, that the locking element compulsorily leads one or multiple circulatory elements out of the blocking region of the chamber, whereby the locking element is positioned, with the locking portion, in the circulatory path of the circulatory elements.

The blocking region of the chamber preferably includes, in front of and behind the locking element, at least a length, viewed in the circumferential direction of at least one circulatory element. The catch likewise arranged in the chamber can thereby pass through an as large as possible pivot region at the second bearing element.

A preferred configuration of the pivoting device provides that the chamber has a constant width over the entire circumference, so that the circulatory elements are guided in a single-tracked manner only, that is in a row one behind the other. The width of the chamber thus corresponds to the diameter of one circulatory element, so that a plurality of circulatory elements, in a row one behind the other, is guided inside the chamber.

Alternatively, the pivot locking device can comprise a chamber which includes a storing region opposite the blocking region, the width of which storing region corresponds to two or multiple times the circumference of the circulatory elements. Inside such a storing region, the circulatory elements can, for example, be arranged two-, three- or multiple-tracked to one another, that means that multiple rows of circulatory elements guided one behind the other are oriented concentrically to one another. Such an arrangement has the advantage that, in a pivoting movement, a reducing of the forces can be made possible.

Moreover, a tapering region is preferably configured between the storing region and the blocking region of the chamber, in which tapering region the circulatory elements, lying next to each other in a two- or multiple-track manner, are transferrable onto a single-track arrangement in the blocking region. The tapering region can be configured funnel-shaped, so that the circulatory elements, formed into multiple tracks, in the tapering region, successively queue one behind the other in a single row, so that these elements thereafter lie only in one row one behind the other. Such a compulsory sorting can be actuated by a rotational movement of the catch in a pivoting movement of the second bearing element to the first bearing element.

To actuate a displacement movement of the circulatory elements inside the chamber, the catch is movably guided in the chamber. Preferably, the catch comprises radially oriented guiding surfaces, which are guided along an inner and outer chamber wall. A targeted force transmission can thereby occur in a pivoting movement of the bearing element, via an end face of the catch extending between the two guiding surfaces, onto the circulatory elements.

Advantageously, the catch comprises a movement path in a chamber with a storing region, which path is delimited via an angular region, along which the storing region extends. Preferably, a stop can be configured between the two bearing elements in order to limit this angular region.

In an catch, which is provided in a chamber with a constant width over the entire circumference, this member can comprise a movement path inside the chamber, which path extends over the entire circumference with exception to the blocking region.

The chamber provided at the first bearing element preferably has a depth which corresponds to the height of a circulatory element. Through the arrangement of only one layer of circulatory elements in the chamber, a particularly flat arrangement can be created.

The circulatory elements can be configured as balls, rollers, pins, arc segments, grains, sand or the like. In particular, in the employment of cylindrical pins or cylindrical rollers, these are preferably guided upright in the chamber, so that the external surfaces of the cylindrical pins of the cylindrical rollers rest on one another inside the chamber during a displacement movement and are supported on the chamber wall. The respective end surfaces of the cylindrical pins of the cylindrical rollers are, on the one hand, oriented to the base of the chamber and, on the other hand, to the connecting surface of the second bearing element. Preferably, polygonal or non-round pins or rollers are provided, which are guided upright. These comprise mutually opposite abutment surfaces or pressure surfaces for force transmission. These pins or rollers can also additionally or alternatively comprise at least one guiding surface, which is guided along a chamber wall. Alternatively, abrasive balls can also be employed.

Moreover, the locking element is preferably arranged, in a non-active or non-activated position, with a power-storing element in a locking position and preferably engages into the chamber in the blocking region. The set angular position is thereby only then released if an active activation occurs. For example, in the employment of the pivot locking device on a lifting device, the support arm can thus, in the lifting and lowering of the vehicle, remain secured in a locked position.

Moreover, the locking element is activatable by a displacement movement, in particular by a displacement movement oriented radially to the course of the chamber in the blocking region, or the locking element is activatable by a rotational movement. The flat arrangement of the pivot locking device can be maintained through the displacement movement, as well as the rotational movement.

A further advantageous configuration of the pivot locking device provides that the catch is detachably coupled with the second locking element. This has the advantage that a simple mounting and an assembly of pivot locking device are made possible. For example, the circulatory elements, as well as the catch, can be inserted in the chamber of the first bearing element in order to subsequently close the chamber by means of the second bearing element, wherein a coupling of the catch to the second bearing element is simultaneously made possible, so that a rotational movement of the second bearing element to the first bearing element can be transferred onto the catch.

Moreover, the first and second bearing element respectively comprise a flange portion for mounting on a component. This makes a flexible employment in different regions possible. Preferably, the pivot locking device is provided, in lifting devices, for lifting and lowering of loads, vehicles or the like, in particular for a support arm arresting.

The object underlying the invention is further achieved by a lifting device for lifting and lowering of loads, vehicles or the like with an up and downwardly movable carrier, on which at least one support arm, in a pivot axis, is pivotably mounted on the carrier, and preferably a free end of the support arm is movable under the load, the vehicle or the like, in which the pivot locking device is provided, according to one of the above described embodiments, between the carrier and the support arm. The support arm can thereby be arrestable, by means of a mechanically simple pivot locking device, in variously-adjustable pivot positions. By means of the finely-staged locking, a very exact positioning of the support arm to the load to be lifted, to the vehicle or the like can be made possible. In addition, the pivot locking device is simple to operate and wear-free. A rapid and smooth pivoting movement of the support arm is also made possible, despite the interposition of the pivot locking device, between the carrier and the support arm.

Moreover, an operating element changeable in position is preferably provided on the carrier of the lifting device, by means of which element, in the lowering of the carrier onto the base, or manually, the locking element of the pivot locking device is transferrable into an unlocking position.

The invention, as well as further advantageous embodiments and further developments of the same, are described in further detail and explained in the following based on the examples illustrated in the drawings. The features to be taken from the description and the drawings can be applied individually or in plurality in any combination, according to the invention. Shown are in:

FIG. 1 a perspective view of two lifting devices for forming a two-column lifting platform, FIG. 2 a schematically enlarged perspective view onto a carrier with support arms of the lifting device arranged thereon, according to FIG. 1, FIG. 3 a schematic sectional view along the carrier and the support arm with a pivot locking device in a locked position, FIG. 4 a schematic sectional view along the carrier and the support arm with the pivot locking device in an unlocked position, FIG. 5 a perspective view from above onto the pivot locking device according to the invention, FIG. 6 a perspective view from below onto the pivot locking device according to FIG. 5, FIG. 7 a schematic view onto a first bearing element of the pivot locking device according to FIG. 5 with a locking element in a locking position, FIG. 8 a schematic view of the first bearing element according to FIG. 7 with a locking device in an unlocked position, FIG. 9 a schematic view onto an embodiment alternative to FIG. 7, of the first bearing element with a locking element in a locked position, FIG. 10 a schematic view onto the first bearing element according to FIG. 9 with a locking element in an unlocked position, FIG. 11 a schematic view onto an alternative embodiment of the first bearing element according to FIG. 7 with a locking element in a locking position, FIG. 12 a schematic view of the first bearing element according to FIG. 11 with a locking element in an unlocking position, FIG. 13 a schematic view onto an alternative embodiment of the first bearing element according to FIG. 7 with an alternative locking element in a locking position, FIG. 14 a schematic enlarged view of the locking device according to FIG. 13 in an unlocking position, FIG. 15 a schematic sectional view of an alternative embodiment of an operating element for actuating the locking device according to FIG. 7 in an unlocking position, FIG. 16 a schematic sectional view of the operating element according to FIG. 15 for actuating a locking position of the locking element of the pivot locking device, FIG. 17 a schematic view onto an alternative embodiment, to FIG. 7, of the first bearing element with a locking element in a locking position, and FIG. 18 a perspective view onto a circulatory element.

Figure 1:
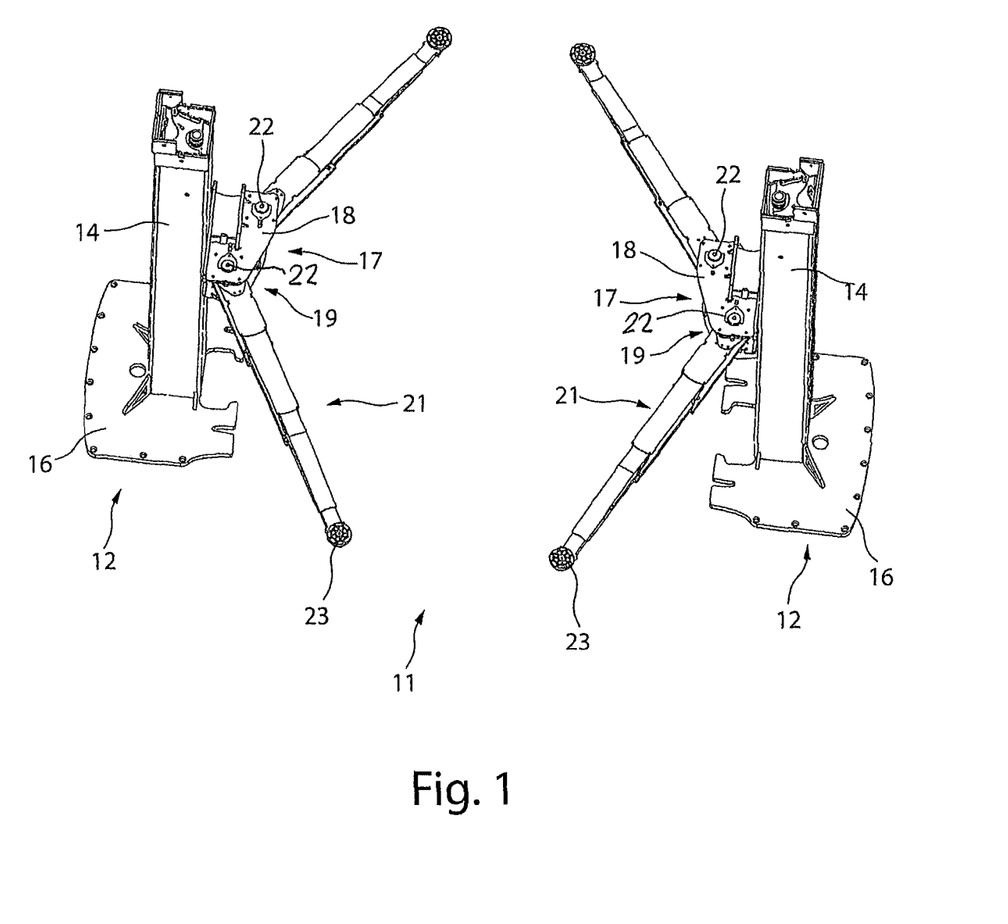

FIG. 1, for example perspectively, illustrates a two-column lifting platform 11, which includes two lifting devices 12 assigned to each other. This lifting device 12 includes a lifting column 14, which is firmly connected, for example, with a baseplate 16, which plate is stationary connected to a ground. A carrier 17 is provided upwardly and downwardly movable along a lifting axis 15 of the lifting device 11. The carrier 17 receives a load bearing means 18. The load bearing means 18 includes a housing portion 19, which is at least partially closed, on the respective outer ends of which portion support arms 21 are pivotably received about a vertical pivot axis 22. These support arms 21 are configured to be telescopic and comprise load bearing elements 23 or provisions opposite the pivot axis 22, in order to interchangeably arrange various load bearing elements 23 thereon.

The carrier 17 moreover receives a drive device. This device can be configured electro-hydraulically, hydraulically or mechanically and comprises a hydraulic unit, according to the illustrated embodiment. This drive device is monitored and actuated by a controller. At least one accumulator can be provided, for example, for supplying energy. The controller advantageously operates wirelessly. In particular, a remote control can be provided in order to actuate the lifting devices 12. In particular, the two lifting devices 12, assigned to each other and oppositely disposed, also communicate with each other wirelessly, in order to ensure, for example, a simultaneous initiation of a lifting- and lowering movement, as well as a mutual monitoring of a synchronism or the like. Alternatively, supply lines and/or control lines can be provided between the two lifting devices 12, so that control signals as well as a power supply are made possible in a wired manner.

According to the exemplarily illustrated embodiment, the lifting device 12 comprises a lifting column 14 with a U-shaped cross section, within which cross-section the carrier 17 is guided, upwardly and downwardly movably, by means of guides. Alternatively, the carrier can also be configured in a sleeve or cartridge-shaped manner and surround the lifting column. In such an arrangement, the drive spindle or the hydraulic cylinder, for lifting or lowering the carrier, is arranged inside the lifting column.

A further alternative embodiment of the lifting device 12 can also be such, that a lifting ram of a ram platform is provided in place of the lifting column and the up- and downwardly movable carrier, wherein the carrier is arranged on the upper end of the lifting ram, on which carrier the support arm(s) are provided.

Moreover, an alternative embodiment of the lifting device 11 can be such, that the up- and downwardly movable carrier 17 is moved up and down by means of a half scissor or a double scissor which, in turn, are activated with a hydraulic cylinder, on which carrier the support arm(s) can be arranged.

Figure 2:
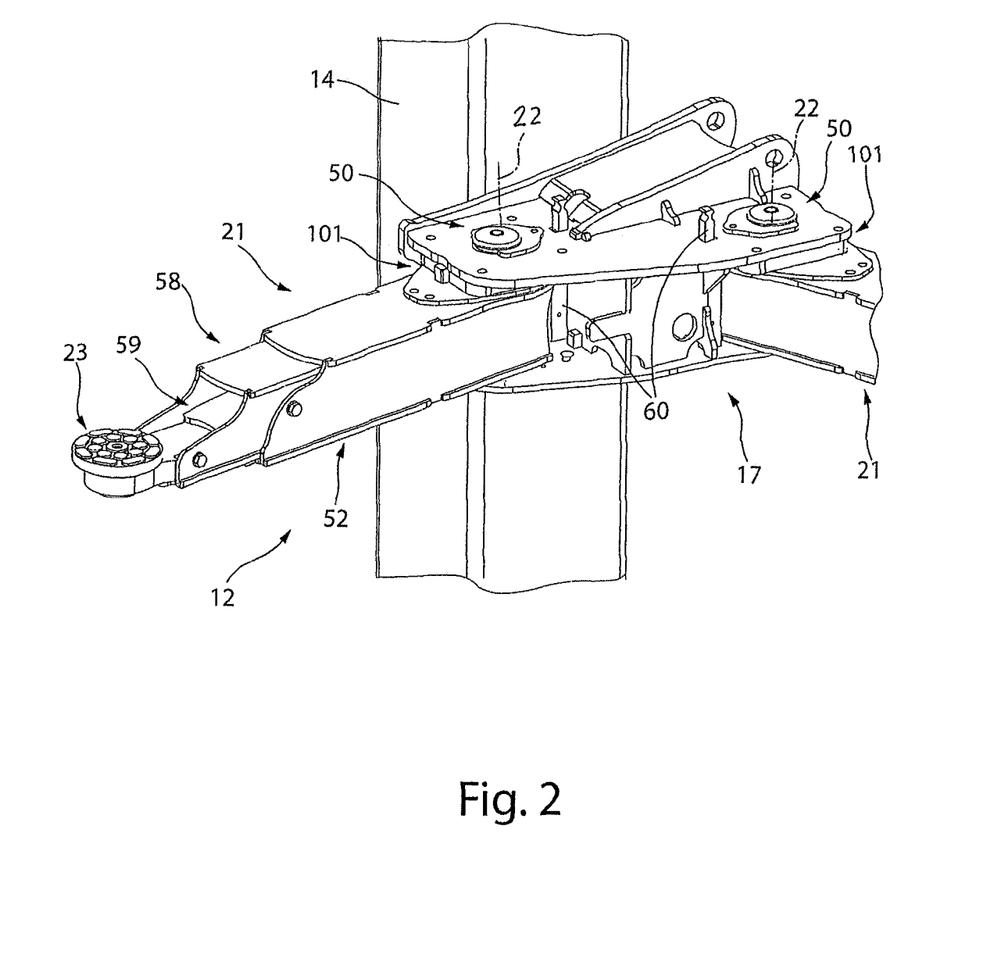

FIG. 2 shows the arrangement of two support arms 21 on a carrier 17, schematically enlarged. The support arm 21 can be extended, for example, and includes a support arm body 52, which receives at least one support arm piece 58 therein displaceably. For example, a first support arm piece 58 is provided, which piece, in turn, receives a second support arm piece 59, on the outer free end of which is arranged the load bearing element 23. Moreover, an operating element 60 is provided on the carrier 17, which element is assigned to a pivoting arrangement 50, through which the support arm 21 is received about the pivot axis 22 in a manner pivotable to the carrier 17. This operating element 60 serves to actuate a pivot locking device 101. This pivot locking device 101 is positioned between the support arm 21 and the carrier 17.

Figure 3:
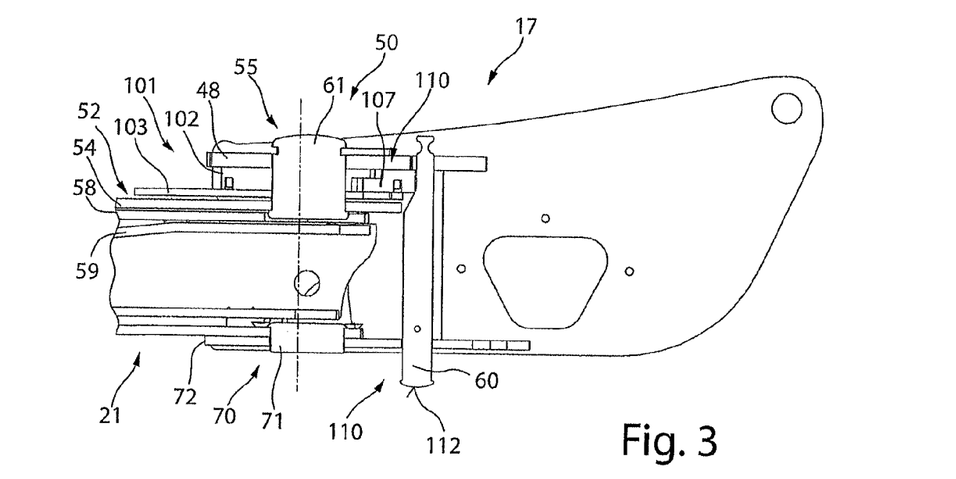
Figure 4:
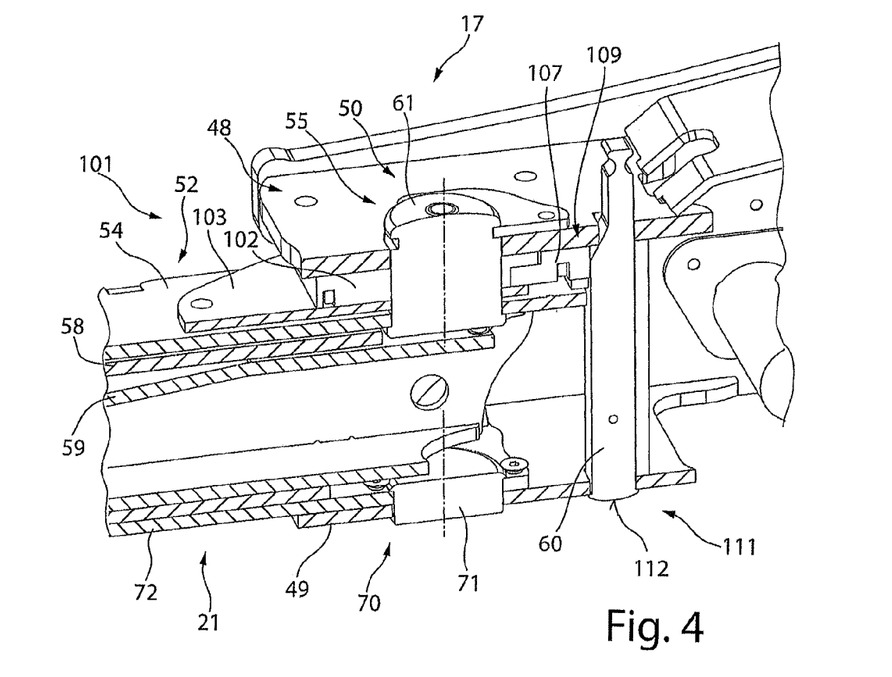

FIG. 3 illustrates a schematic sectional view along the support arm 21 and the carrier 17 according to FIG. 2. FIG. 4 shows a perspective sectional view to FIG. 3, with the operating element 60 being activated.

The pivoting arrangement 50 consists of an upper pivot bearing 55 and a lower pivot bearing 70. These pivot bearings 70 are aligned along the common pivot axis 22. This arrangement of the upper pivot bearing 55 and the lower pivot bearing 70 has the advantage that, within the support arm body 52, a free space is brought created, so that at least one first and/or second support arm piece 58, 59 is positionable between the upper and lower pivot bearings 55, 70. With respect to the pivoting arrangement 50 as well as the arrangement and embodiments and also the connection of the support arm 21 to the carrier 17, reference is made to WO 2014/207217 in its entirety.

The pivot locking device 101 is provided to arrest the support arm 21 in an angular position or pivot position to the carrier 17. This device is provided, for example, between an upper carrier portion 48 of the carrier 17 and an upper housing wall 54 of the support arm body 52. This pivot locking device 101 is assigned to the upper pivot bearing 55 of the pivoting arrangement 50. Alternatively or additionally, the pivot locking device 101 can be assigned to the lower pivot bearing 70. In this case, the pivot locking device 101 is positioned between a lower carrier portion 49 of the carrier 17 and a lower housing wall 72 of the support arm body 52.

The pivot locking device 101 includes a first bearing element 102, as well as a second bearing element 103. Each of the bearing elements 102, 103 comprises a perforation 104, 106, through which a pivot bolt 61 of the upper pivot bearing 55 extends. The pivot locking device 101 moreover comprises a locking element 107 which fixates the first and second bearing element 102, 103, in a position to one another, or releases a relative pivot movement. In FIG. 3, the locking element 107 is provided in a locking position 108. The pivot locking device 101 is blocked in this locking position 108. The support arm 21 is secured against rotation in its position oriented to the carrier 17.

In FIG. 4, the operating element 60 is transferred into an activation position 111. This can occur by means of a manual lifting of the operating element 60. Alternatively, the carrier 17 can be lowered onto a base, so that a lower contact surface 112 of the operating element 60 rests upon the base and transfers the operating element 60 into the activation position 111. The locking element 107 is thereby transferred into an unlocking position 109. A pivot movement of the first bearing element 102 to the second bearing element 103 is released. The support arm 21 is pivotable, about the pivot axis 22, to a desired position relative to the carrier 17.

The first bearing element 102 comprises a flange portion 114 or a fastening portion, through which the pivot locking device 101 is fastenable to the carrier 17, in particular to the upper carrier portion 48. The second bearing element 103 likewise comprises a flange portion 115 or fastening portion so that a support arm 21, in particular an upper housing wall 54 of the support arm body 52, is fastenable thereto. The pivot bolt 61 extends through the perforations 104, 106 of the first and second bearing elements 102, 103, as well as through the corresponding openings in the upper carrier portion 48 and the upper housing wall 54. The pivot locking device 101 is thereby arranged and oriented coaxially to the pivot axis 22. The load bearing between the carrier 17 and the support arm 21 occurs via the at least one pivot bolt 61, 71.

Figure 5:
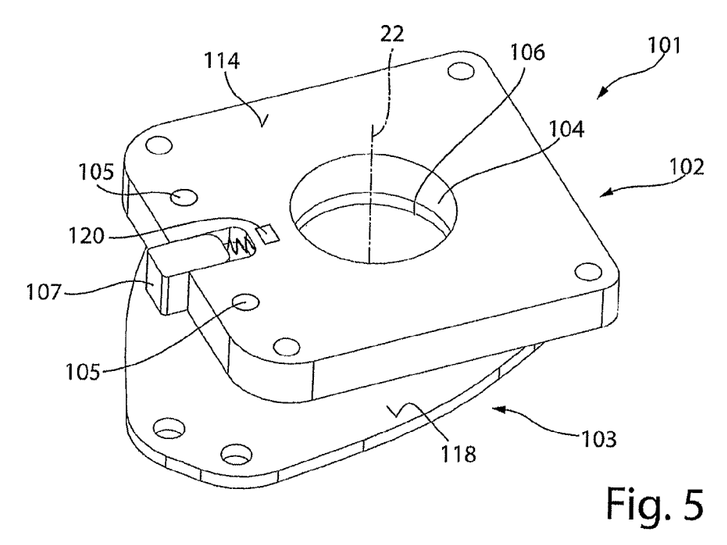
Figure 6:
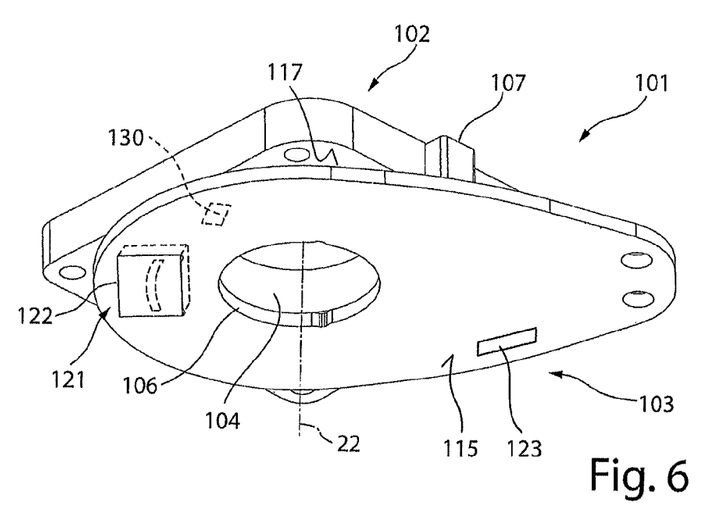

FIG. 5 illustrates a perspective view onto the pivot locking device 101. FIG. 6 shows a perspective view from below.

The first and/or second bearing elements 102, 103 are preferably configured in a plate-shaped manner. The flange portion 114, 115 is provided respectively on the external side of the first and second bearing elements 102, 103. For example, this can be a planar connecting surface with fastening boreholes or the like included therein. The locking element 107 is received on the first bearing element 102. According to a first embodiment, this locking element is provided displaceably on the first bearing element 102. The first and second bearing elements 102, 103 comprise connecting surfaces 117, 118 respectively directed at one another, which rest on one another and slide along one another in a pivot movement of the first bearing element 102 relative to the second bearing element 103 about the pivot axis 22. A sliding-friction reducing surface coating can preferably be provided on the connecting surface(s) 117, 118. It can likewise be preferably provided that the surface portions of the connecting surfaces 117, 118, which portions are resting on one another, are reduced in order to decrease the friction of the pivot locking device.

The bearing element 103 receives a catch 121, which is provided, in particular in an insertable manner, firmly on the bearing element 102 or detachably on the bearing element 102. This catch 121 can, for example, have a geometric contour 122 secured against rotation, so that this catch orients itself automatically in the bearing element 103. After the insertion of the catch 21 in the bearing element 103, this catch, with its external side, is flush to the flange portion 115.

The bearing elements 102 and 103 can be held together by a transport securing means 105 (FIG. 5) in a predefined position to one another until the bearing element 102 is fastened to the carrier 17 and the bearing element 103 is fastened to the support arm 21. The transport securing means 105 can be configured to the end that a through bore is provided in the bearing element 102 and a thread is made in the bearing element 103 so that, by means of a screw, which is inserted through the through bore in the bearing element 102, the two parts are fixed to one another by means of the thread in the bearing element 103. After the mounting, this transport securing means 105 can, in a simple way, be detached and removed so that the bearing elements 102 and 103 are pivotable relative to one another about the axis 22.

A sensor 120 (FIG. 5) can be provided for monitoring the pivot locking device 101, by means of which sensor the position of the locking element 107 is monitored. Insofar as the locking element 107, in a locking position 108, is identified by the sensor 120, a signal can be transmitted to the controller that a lifting and/or lowering of the support arms 21 is released.

Moreover, a further sensor 130 (FIG. 6) can be provided between the first and second bearing elements 102, 103. By means of this sensor 130, can be detected a rotational position or angular position between the bearing element 102 and the bearing element 103. This allows for detecting the orientation of the support arm(s) 21 with respect to a working space.

A sensor 123 (FIG. 6) can be provided on the bearing element 103, in particular on a lower side 115 of the bearing element 103. Using this sensor 123, a stress can be detected which, upon lifting a load, acts on the support arm 21. An overload protection, for example, can thereby be provided, insofar as the attempt is undertaken to lift a too heavy load. The signals of the above-mentioned sensors 120, 123, 130 can advantageously be transmitted to the controller of the lifting device 11 in a wireless manner.

Figure 7:
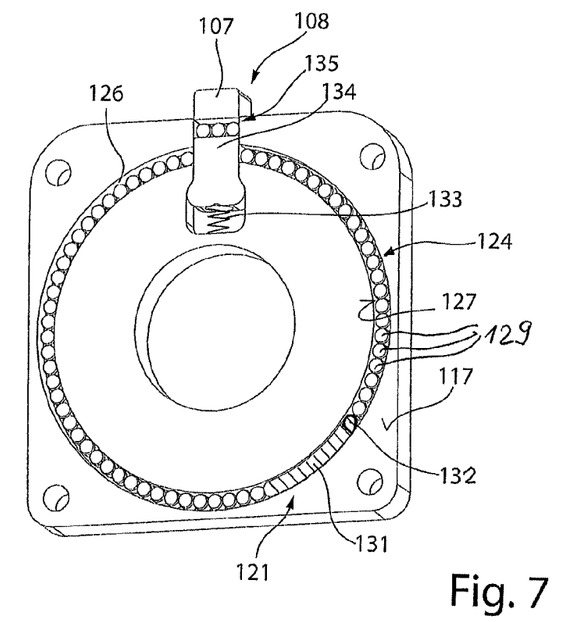
Figure 8:
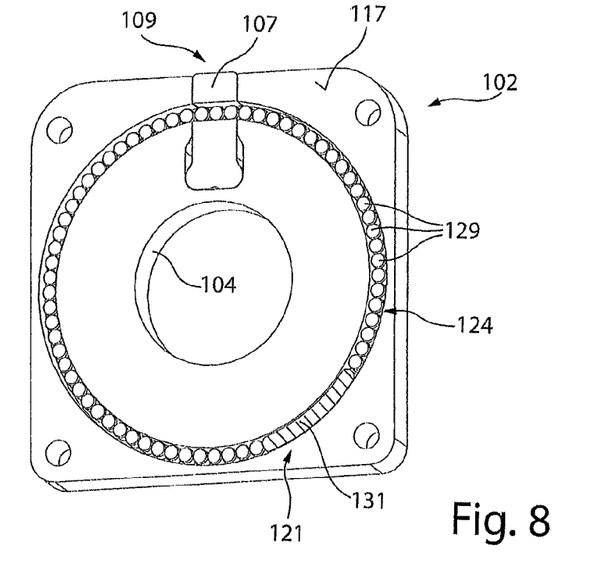

FIG. 7 illustrates a view onto an internal side, or onto the connecting surface 117 of the first bearing element 102. The second bearing element 103 is removed. The locking element 107 is illustrated in a locking position. FIG. 8 shows an analogous view to FIG. 7, with the deviation that the locking element 107 is arranged in an unlocking position 109.

The first bearing element 102 includes a circulating chamber 124. This chamber 124 comprises a closed or continuous circulatory path. The circulatory path of the chamber 124 comprises a base 125, which is depressed relative to the connecting surface 117. The chamber 124 comprises two chamber walls 126, 127 oriented concentrically to one another. The chamber 124 is configured with a uniform width over its entire circumference. A plurality of circulatory elements 129 is arranged in the chamber 124. These elements can consist of balls, for example. In the exemplary embodiment, the circulatory elements 129 are configured as cylindrical rollers or cylindrical pins. These circulatory elements 129 are provided upright in the chamber 124, so that the respective circumferential wall of the circulatory elements 129 rolls off on the chamber wall 126, 127. The chamber 124 has a constant width, which is adapted to the diameter of the circulatory elements 129. The circulatory elements 129 are thereby arranged in the chamber 124 in a single-tracked manner. The circulatory elements 129 are thus positioned in a row one behind the other in the chamber 124.

The catch 121 engages into the chamber 124 and can, for example, be configured web-typed. This web 131 is adapted to the curvature of the chamber 124. The respective end-faced ends of the web 131 rest directly against a circulatory element 129, in turn.

The locking element 107 is held in the locking position 108 by a power-storing element 133. In this locking position, a locking portion 134 of the locking element 107 crosses the circulatory path of the circulatory elements 129 or the chamber 124. Here, individual circulatory elements 129 are guided out of the chamber 124 and are stored in a retaining portion 135 of the locking element 107. Since the space inside the chamber 124, between the locking element 107 and the catch 121, or the web 131 of the catch 31 engaging into the chamber 122, is filled out completely by circulatory elements 129, a displacement movement of the catch 121 along the chamber 124 is blocked. A locking of the first bearing element 102, to the second bearing element 103, is thereby provided.

In order to initiate a pivot movement between the first and second bearing element 102, 103, the locking element 107 is transferred into the locking position 109 according to FIG. 8. Here, the circulatory elements 129 stored in the retaining portion 135 enter, in turn, in the circulatory path of the chamber 124. This path is opened so that a circulatory movement of the circulatory elements 129 is made possible. This displacement movement of the circulatory elements 129 is actuated via the catch 21.

According to an alternative embodiment not further illustrated, it can be provided that the retaining portion 135 can also store only one or two circulatory elements 129. Depending upon the selection and physical configuration of the circulatory elements 192, multiple circulatory elements 129 can also be stored in the retaining portion 135 of the locking element 107.

In this embodiment, the center-to-center distance from a first to a neighboring pivot position is defined by the diameter of the circulatory elements 129.

In this embodiment, a pivot region of the first bearing element 102, relative to the second bearing element 103, can be provided in an angular region, which is reduced by the region of the catch 21, in particular the length of the web 131 and the length of the retaining portion 135, seen in the direction towards the chamber 124.

A further sensor 132 can be provided on the catch 121, or in a region in which the catch 121 is connected with the bearing element 103, through which sensor a torque load acting on the pivot locking device 101 can be detected. This sensor 132 can also wirelessly transmit signals to the controller.

Figure 9:
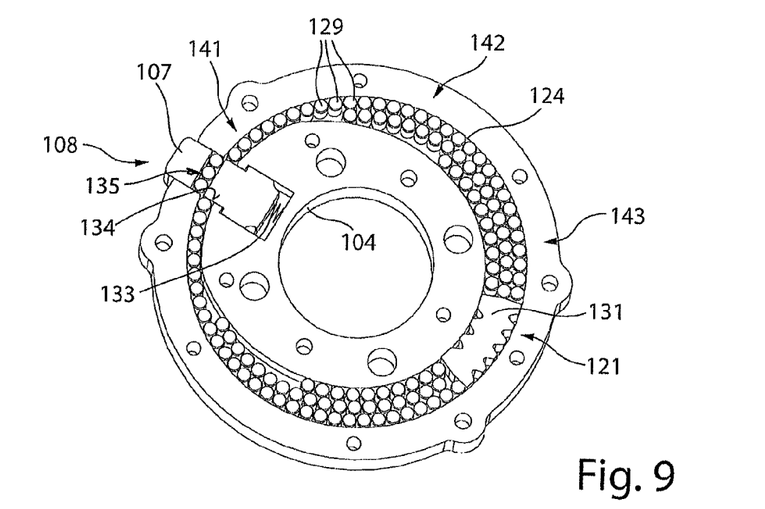

FIG. 9 illustrates an alternative embodiment to FIG. 7, of the first bearing element 102. This embodiment deviates from the embodiment in FIG. 7 in the configuration of the chamber 124.

The chamber 124 comprises a blocking region 141 to the left and right of the locking element 107, in which region one, two or multiple circulatory elements 129 are guided in a single-tracked manner. Respectively adjoining thereto, a tapering region 142 is provided, which connects the blocking region 141 with a storing region 143. The storing region 143 is preferably opposite the blocking region 141. The width of the chamber 124 is greater in the storing region 143 than in the blocking region 141. The circulatory elements 129 can for example be arranged in a two- or multiple-tracked manner to one another in the storing region 143. Two or multiple rows of circulatory elements 129, oriented concentrically to one another, can thus be arranged in the storing region 143. In the exemplary embodiment, the storing region 143 is configured in a three-tracked manner. The tapering region 142 makes possible that the circulatory elements 129 arranged in the storing region 143 in a multiple-tracked manner, are transferred into a single-tracked arrangement in the blocking region 141.

In this embodiment according to FIG. 3, the pivot region of the first bearing element 102 to the second bearing element 103 is defined by the circumferential angle 144 of the storing region.

Within the storing region 143, the internal and external chamber 126, 127 are oriented concentrically at a constant distance, so that a guiding of the web 131 is provided. With regard to the further functioning, arrangement and configuration, reference is made to FIGS. 7 and 8.

Figure 10:
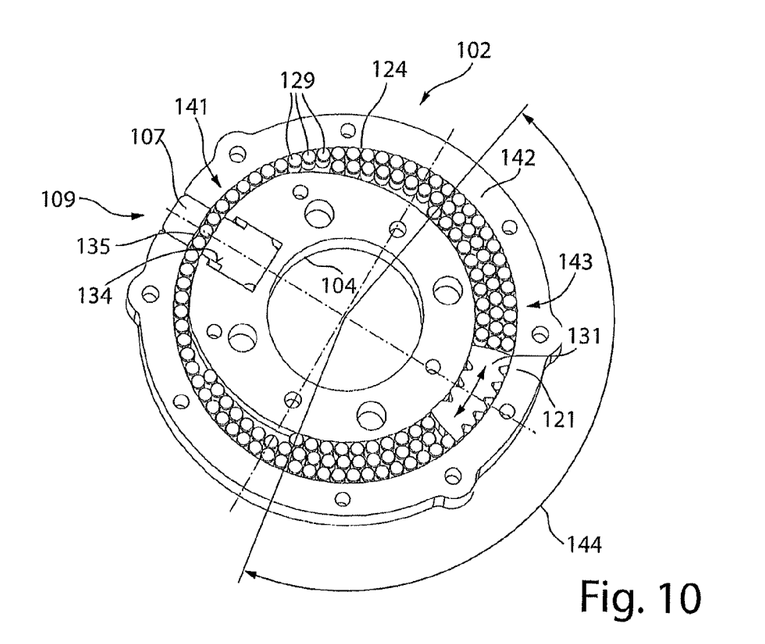
Figure 11:
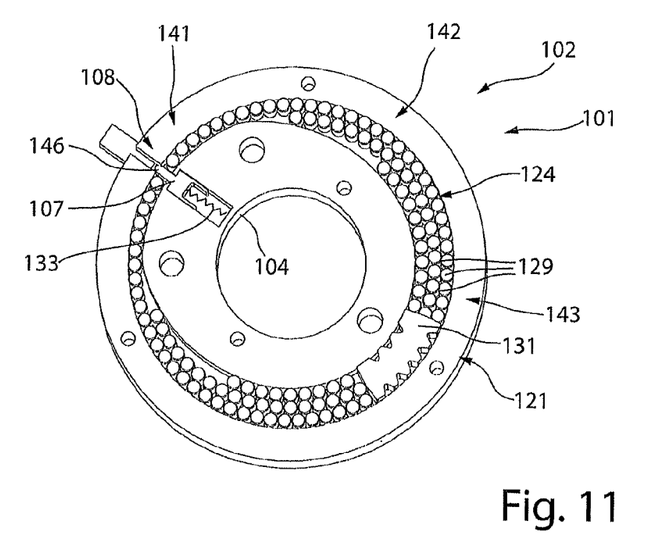
Figure 12:
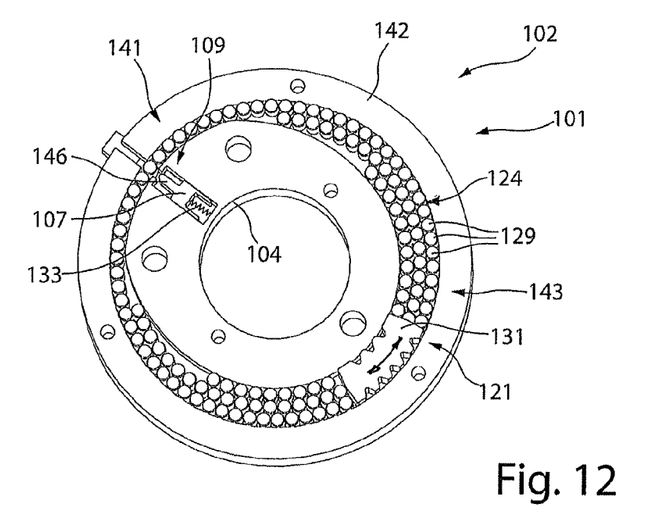

FIGS. 11 and 12 illustrate an alternative embodiment to FIGS. 9 and 10, of the pivot locking device 101. This embodiment deviates in the configuration of the locking element 107 from the embodiment in FIGS. 9 and 10. The locking element 107 includes no retaining portion 135. Much rather, a mandrel 146 is provided, which engages into a locking position 108 of the locking element 107 according to FIG. 11 between two adjoining circulatory elements 129, in a transferring out of an unlocking position 109 of the locking element 107 according to FIG. 12, and stops the circulatory path of the circulatory elements 129 inside the chamber 124.

Figure 13:
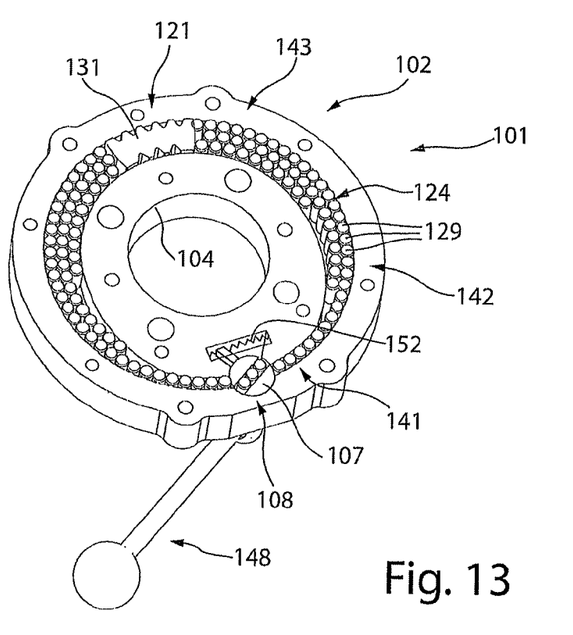
Figure 14:
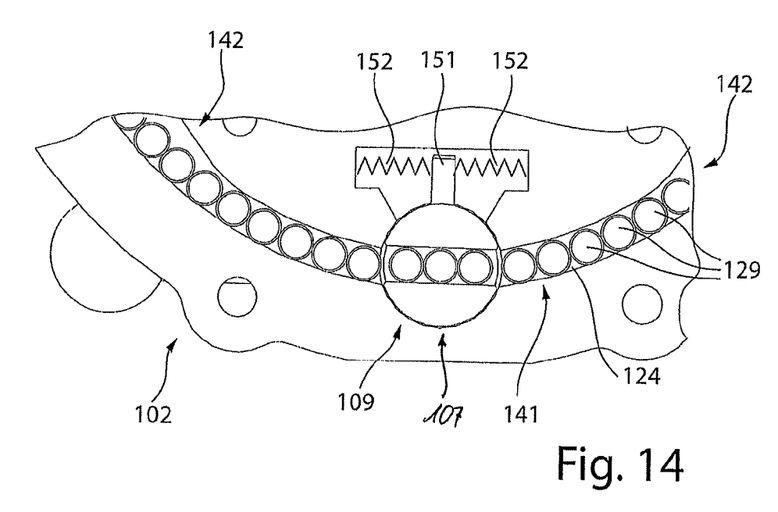

FIGS. 13 and 14 further illustrate an alternative embodiment to FIGS. 9 to 12, of the pivot locking device 101. This pivot locking device 101 shows a further alternative configuration of the locking element 107. A rotational movement of the locking element 107 occurs in order to actuate the locking element 107 out of an unlocking position 109 according to FIG. 14 into a locking position 108 according to FIG. 13. The circulatory elements 129 positioned in the retaining portion 135 of the locking element 107 are guided out of the circulatory path of the chamber 124 so that, with circulating wall portions of the locking element 107, the circulatory path is blocked inside the chamber 124. The activation of the locking element 107 can be actuated manually by means of a lever 148, or also via the operating element 60. The pivot movement of the locking element 107 is limited by a stop 151 in the form of a pin. On one or both sides of the stop 151, at least one return element 152, in particular a compression spring element, is provided. This return element 152 is introduced into the recess, inside which the stop 151 is pivotable. That is, a return of the locking element 107 into an unlocking position 109 can thereby not be carried out independently. Otherwise, the embodiments relating to the preceding embodiments apply.

Figure 15:
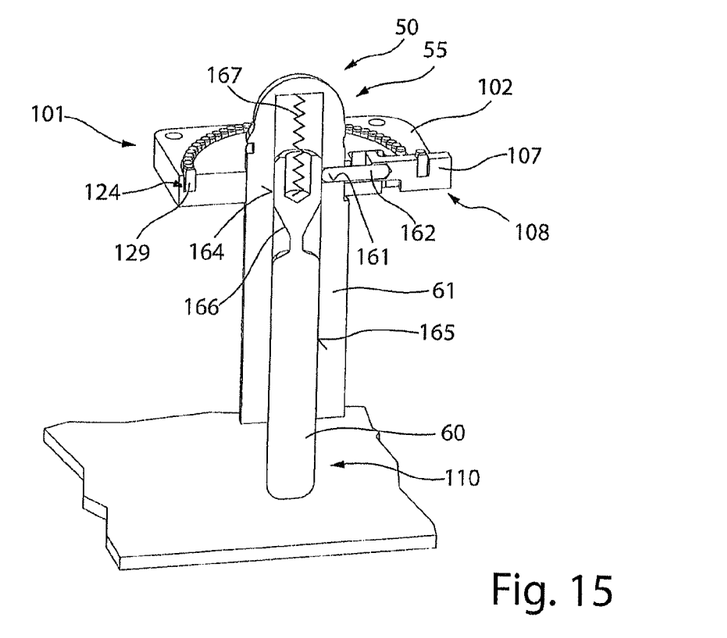
Figure 16:
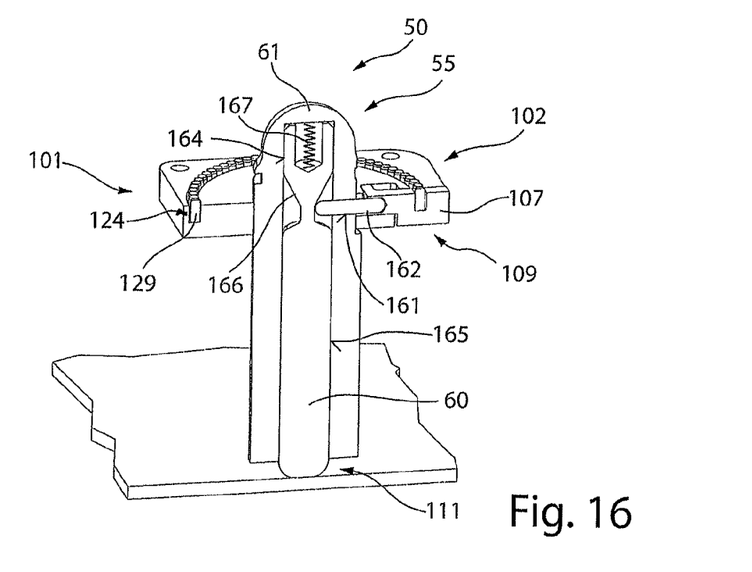

FIG. 15 illustrates a schematic sectional view of an alternative actuation of the pivot locking device 101 by an operating element 60. FIG. 15 shows the pivot locking device 101 only partially with the first bearing element 102 and the locking element 107 in the locking position 108. FIG. 16 shows this arrangement in an unlocking position 103.

In this embodiment, the operating element 60 is guided in the pivot bolt 61, which extends through the perforations 104, 106 of the first and second bearing elements 102, 103. A pin 162 is guided via a cross bore 161 in said pivot bolt 61. An end of the pin 162 acts upon the locking element 107. The opposite end of the pin 161 is oriented towards the operating element 60. The operating element 60 comprises a first and second guiding portion 164, 165 for the axial displacement movement within the pivot bolt 61. Between the first and the second guiding portion 164, 165, a control element 166 is provided in the form of a conically extending surface, which tapers in cross-section with respect to the first and second guiding portion 164, 165. By means of a power-storing element 167, the operating element 60 is arranged in an inactive position 110. The guiding portion 164 presses the pin 161 against the locking element 107, so that this element is arrested in the locking position 108. In the lowering of the pivot locking device 101—for example in the direction towards the floor—the operating element 60 plunges into the pivot bolt 61 and is transferred into an activation position 111. The locking element 107 is transferred, through the power-storing element 133, into the unlocking position 107, since a movement path for the pin 162 is released due to the control element 166 and the pin 162 can plunge into the pivot bolt. This is illustrated in FIG. 16. As soon as the position is set and the pivot locking device 101 is lifted, the power-storing element 167 presses the bolt 60 into the inactive position 110, and the locking element 107 is transferred into the locking position 108.

Figure 17:
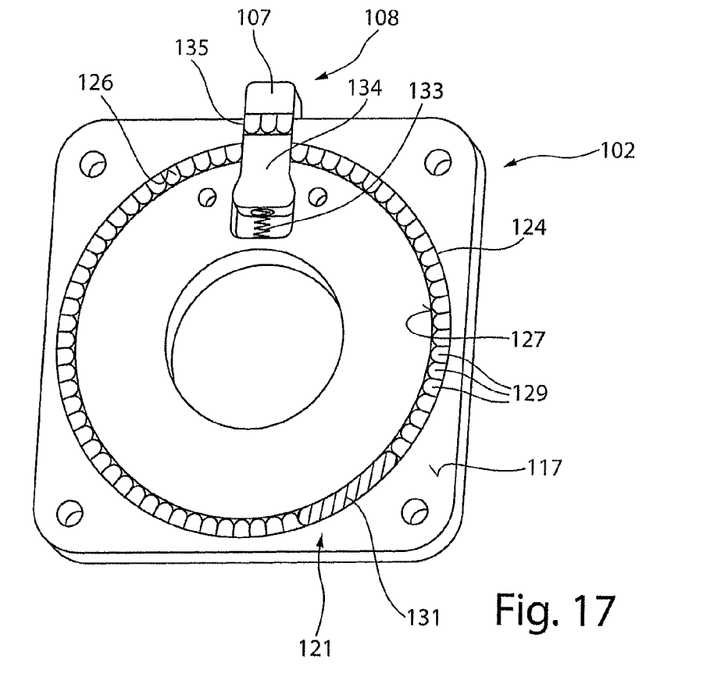

FIG. 17 shows a schematic view onto a first bearing element 102, according to FIG. 7. This embodiment in FIG. 17 deviates in the specific configuration of the circulatory elements 129. The circulatory element 129, which is used in the embodiment of the bearing element 102 according to FIG. 17, is illustrated in a perspective view in FIG. 18. This circulatory element 129 is a body, facing away from a pin or a roller, with a longitudinal axle, which comprises an outer guiding surface 171, which surface can be configured rectilinearly or slightly curved. In the event of the curved embodiment, this curvature can be adapted to the curvature of an external chamber wall 126, so that a guiding along the chamber 126 is possible. A rounded sliding surface 172 is preferably provided opposite the guiding surface 171, which sliding surface is supported on the internal chamber wall 127. Pressure surfaces 173 are provided between the guiding surface 171 and the sliding surface 172. These pressure surfaces 173 are oriented parallel to one another or inclined in a slight angle to one another. In the latter case, the angle is adapted to the size of the diameter of the chamber 124. The two support elements 129 adjacent to one another can thereby rest on one another with their pressure surface 173 so that a surface pressing is provided. A geometry of the circulatory element 129 results from this arrangement, which element, in a sectional view or in a plan view, corresponds to a loaf of bread.

Figure 18:
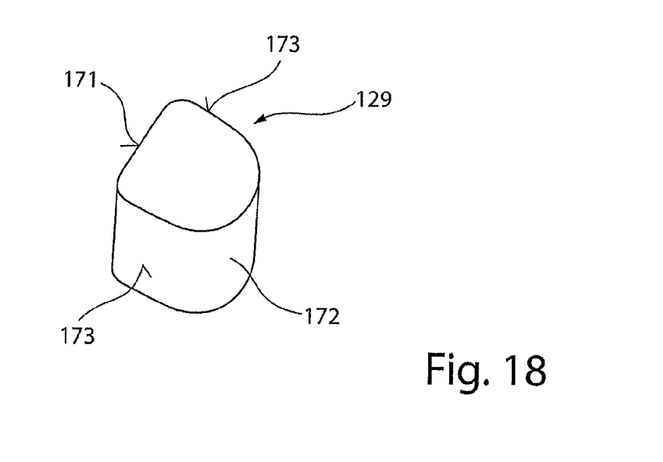

In the circulatory element 129 illustrated in FIG. 18, the guiding surface 171 and the sliding surface 172 can also be reversed. Alternatively, the guiding surface 171, like the sliding surface 172, can also be configured with a curvature. Likewise, the sliding surface 172 can, instead of the illustrated contour, also have the contour of the guiding surface 171. The respective end faces of the circulatory elements 129 can be configured as a sliding surface or as a spherical surface, in order to achieve a low friction on the chamber base 125.

The invention claimed is:

1. A pivot locking device of two bearing elements aligned along a common axis, in which one or both bearing elements are pivotable about a common pivot axis,
   with a first bearing element which comprises a perforation,
   with a second bearing element which comprises a perforation, wherein the first and second bearing element are oriented with the perforations in alignment to one another,
   with a chamber provided on the first bearing element, which chamber comprises a circulatory path for circulatory elements and is open to the second bearing element and is closed, by a connecting surface facing to the chamber, at the second bearing element,
   with a plurality of circulatory elements arranged in the chamber,
   with an catch, arrangeable on the second bearing element, which catch engages into the circulating chamber and is positioned between circulatory elements and, in a pivot movement of the second bearing element to the first bearing element, displaces the circulatory elements in the chamber along the circulatory path, and
   with a locking element arranged on the first bearing element, which locking element, in an unlocking position, unblocks the circulatory path for the circulatory elements in the chamber and, in a locking position of the locking element, blocks a displacement movement of the circulatory elements along the circulatory path of the chamber.

2. The pivot locking device according to claim 1, wherein the chamber is configured in the shape of a circle or a circular arc.

3. A pivot locking device according to claim 1, wherein the chamber comprises a blocking region with a width, in front of and behind the locking element blocking the chamber, in which blocking region the circulatory elements are displaceably guided in a single-tracked manner.

4. The pivot locking device according to claim 3, wherein the blocking region of the chamber, in front of and behind the locking element, includes at least a length of at least one diameter of the circulatory element.

5. The pivot locking device according to claim 1, wherein the chamber has a constant width over the entire circumference of the circulatory path, so that the circulatory elements, are guided in a single-tracked manner.

6. The pivot locking device according to claim 1, wherein the chamber comprises a storing region opposite the locking element, the width of which region corresponds to two or multiple times the diameter of the circulatory elements and is configured, in particular, in a two- or multiple-tracked manner.

7. The pivot locking device according to claim 6, wherein a tapering is configured between the storing region and the blocking region, in which tapering region the circulatory elements, arranged in a two- or multiple-tracked manner, are transferrable to a single-tracked arrangement in the blocking region.

8. The pivot locking device according to claim 1, wherein the catch is movably guided in the chamber and comprises preferably radially oriented guiding surfaces, which are displaceably guided along an internal and external chamber wall.

9. The pivot locking device according to claim 6, wherein the catch comprises a movement path in a chamber with a storing region, which path is delimited by an angular region, along which the storing region extends.

10. The pivot locking device according to claim 1, wherein the catch, in a chamber with a constant width of a circulatory path, has a movement path, over the entire circumference, which path is reduced by the dimension of the portion of the locking element positioned in the chamber and the length of the catch.

11. The pivot locking device according to claim 1, wherein the chamber has a depth which corresponds to the height of a circulatory element.

12. The pivot locking device according to claim 1, wherein the circulatory elements are configured as balls, polygonal or non-round pins, rollers, pins, arc segments, grains or sand.

13. The pivot locking device according to claim 1, wherein the locking element is arranged, in an inactive position, with a power-storing element in a locking position and blocks the circulatory path in the chamber.

14. The pivot locking device according to claim 1, wherein the locking element comprises a control element, in particular an actuation surface or control edge for active transferal into an unlocking position.

15. The pivot locking device according to claim 1, wherein the locking element is activatable by a displacement movement, in particular radially to the course of the circulatory path of the chamber, or by a rotational movement.

16. The pivot locking device according to claim 1, wherein the catch is detachably coupled with the second bearing element.

17. The pivot locking device according to claim 1, wherein the first and second bearing element respectively comprise a flange portion for mounting, respectively, on a component.

18. The lifting device for lifting and lowering loads, vehicles or the like, with an upwardly and downwardly movable carrier, on which at least one support arm is pivotably mounted about a pivot axis on the carrier, wherein at least one pivot locking device, according to claim 1, is arranged between the carrier and the support arm.

19. The lifting device according to claim 18, wherein an operating element, alterable in position to the carrier, is provided on the carrier, by means of which element the locking element of the pivot locking device is transferrable into an unlocking position, and the operating element is preferably activatable, manually or in the lowering of the carrier onto the floor.

20. The pivot locking device according to claim 12, wherein the pins or rollers are guided upright in the chamber so that the external surfaces or pressure surface of the pins or rollers rest on one another, and the guiding surfaces and/or sliding surfaces of the circulatory elements are supported on the chamber wall.

* * * * *